US012673774B2

(12) United States Patent
Lagonotte

(10) Patent No.: US 12,673,774 B2
(45) Date of Patent: Jul. 7, 2026

(54) METHOD FOR DETERMINING THE POSITION OF AN ACTUATING DEVICE, CORRESPONDING ACTUATING DEVICE

(71) Applicant: PGA ELECTRONIC, Montierchaume (FR)

(72) Inventor: Romeo Lagonotte, Montierchaume (FR)

(73) Assignee: PGA ELECTRONIC, Montierchaume (FR)

(*) Notice: Subject to any disclaimer, the term of this patent is extended or adjusted under 35 U.S.C. 154(b) by 438 days.

(21) Appl. No.: 18/363,896

(22) Filed: Aug. 2, 2023

(65) Prior Publication Data

US 2024/0043122 A1 Feb. 8, 2024

(30) Foreign Application Priority Data

Aug. 3, 2022 (FR) ...................................... 2208047

(51) Int. Cl.
| | |
|---|---|
| *G01D 5/12* | (2006.01) |
| *B64D 11/06* | (2006.01) |
| *G01D 18/00* | (2006.01) |

(52) U.S. Cl.
CPC ........ *B64D 11/064* (2014.12); *B64D 11/0643* (2014.12); *G01D 5/12* (2013.01); *G01D 18/001* (2021.05)

(58) Field of Classification Search
CPC ............ B64D 11/06395; B64D 11/064; B64D 11/0641; B64D 11/0643; B64D 11/0644; G01D 18/001; G01D 5/12
See application file for complete search history.

(56) References Cited

U.S. PATENT DOCUMENTS

| | | | |
|---|---|---|---|
| 6,871,120 B1 * | 3/2005 | Nivet ............... | B64D 11/06395 |
| | | | 318/568.17 |
| 7,116,099 B2 * | 10/2006 | Saito ...................... | G01D 3/022 |
| | | | 324/207.25 |

(Continued)

FOREIGN PATENT DOCUMENTS

| | | |
|---|---|---|
| WO | 2013148111 A1 | 10/2013 |
| WO | 2014009356 A1 | 1/2014 |

OTHER PUBLICATIONS

Jacob Davis , Jun. 13, 2022, pp. 1-4 (https://www.campbellsci.com/blog/simplify-sensor-installation-using-wind-direction-offsets#:~:text=The%20360%20added%20with%20the,lines%20using%20If/Then%20statements.) Available Jun. 13, 2022) (Year: 2022).*

(Continued)

*Primary Examiner* — Scott T Baderman
*Assistant Examiner* — Mario M Velez-Lopez
(74) *Attorney, Agent, or Firm* — McDonald Hopkins LLC

(57) ABSTRACT

A method determines the position of an actuating device of an element of an aircraft seat. The actuating device includes a calculating unit, an actuator movably mounted on an output shaft for actuating the element, the output shaft being connected to an angular position encoder so a position (X) of the actuator on the output shaft corresponds to a single angular position (θ) of the encoder. The method includes a preliminary submethod of automatically calibrating the actuating device including: placing the actuator at a predetermined position (Xref) corresponding to an expected angle value (θatt) of the encoder; measuring an initial positioning angle value (θini) of the encoder when the actuator shaft is in the predetermined position (Xref); comparing the initial positioning angle value (θini) and the expected angle value (θatt) calculating the angular offset of the encoder signal, (Continued)

with $\theta\text{décal}=(\theta\text{ini}-\theta\text{att})$ [MODULO 360°], $\theta$decal being between 0° and 359°.

11 Claims, 2 Drawing Sheets

(56)                   References Cited

U.S. PATENT DOCUMENTS

|               |       |         |                    |
|---------------|-------|---------|--------------------|
| 9,854,912 B2* | 1/2018 | Iacobucci | B60N 2/06 |
| 10,889,224 B2* | 1/2021 | Minato | B60N 2/995 |
| 10,946,772 B2* | 3/2021 | Koh | B60N 2/20 |
| 11,401,038 B1* | 8/2022 | Warwick | B64D 11/064 |
| 2002/0101106 A1* | 8/2002 | Kim | B60N 2/0224 |
|               |       |         | 297/362.11 |
| 2007/0050111 A1* | 3/2007 | Mattes | A61G 5/04 |
|               |       |         | 701/36 |

| | | | |
|---|---|---|---|
| 2008/0255788 A1* | 10/2008 | Muhammad | B64D 11/0641 |
| | | | 702/94 |
| 2015/0076891 A1* | 3/2015 | LaPointe | A47C 31/008 |
| | | | 297/85 M |
| 2015/0329012 A1* | 11/2015 | Nivet | B60N 2/22 |
| | | | 297/463.1 |
| 2015/0375865 A1* | 12/2015 | Fischer | B60N 2/22 |
| | | | 701/49 |
| 2016/0258758 A1* | 9/2016 | Houston | G01D 5/145 |
| 2016/0264247 A1* | 9/2016 | Philipp | B64D 11/0639 |
| 2020/0294401 A1* | 9/2020 | Kerecsen | G08G 1/205 |
| 2020/0350840 A1* | 11/2020 | Sahhary | G01D 5/2448 |
| 2025/0326488 A1* | 10/2025 | Trillaud | B64D 11/06 |

OTHER PUBLICATIONS

Search Report issued in French Patent Application No. 2208047 dated Feb. 16, 2023.

* cited by examiner

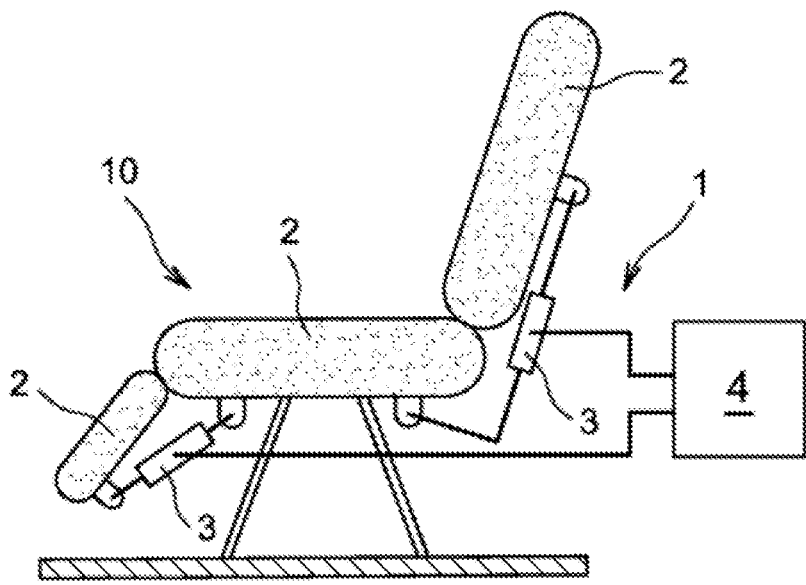
Fig. 1
Fig. 2
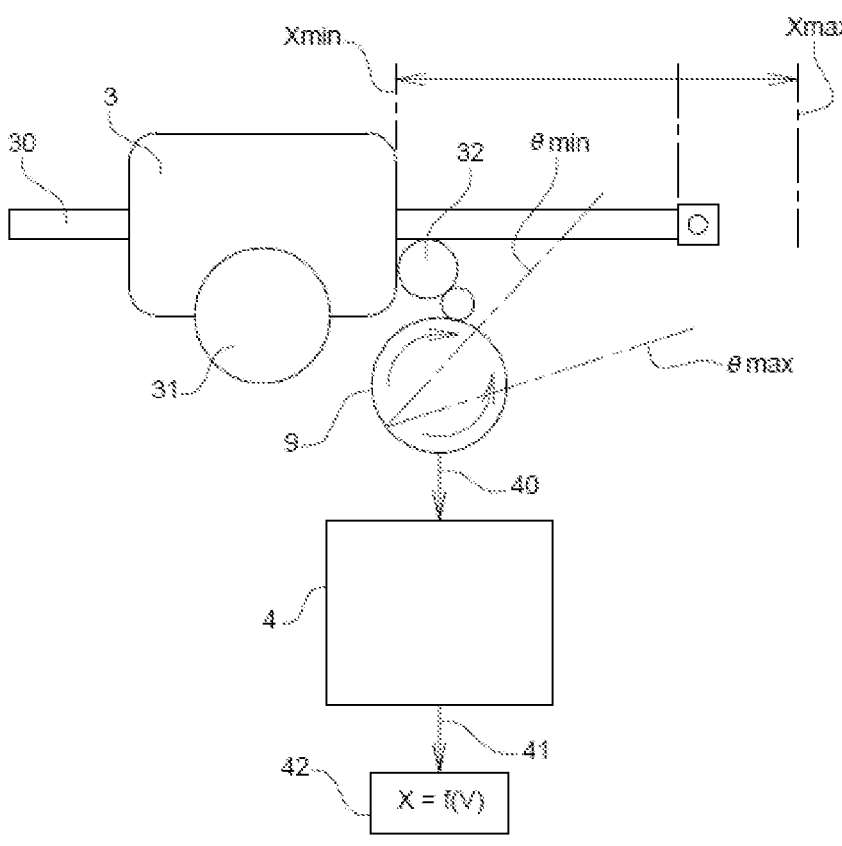

METHOD FOR DETERMINING THE POSITION OF AN ACTUATING DEVICE, CORRESPONDING ACTUATING DEVICE

FIELD OF THE INVENTION

The present invention relates to the field of actuating devices for elements to be actuated, for example seats.

In particular, the invention is applicable to the actuation of seats in the field of aviation, and relates more particularly to a method for determining the position of an actuating device of one or more seat elements.

PRIOR ART

It is known that there is a desire to use seats which can be positioned in a plurality of positions, for example in transport vehicles such as aircraft, ships and trains, and in particular in more expensive classes.

In order to be able to change the position of the user on the seat, it is known to equip seats with electric actuating devices allowing the seat configurations to be varied by moving movable seat elements.

The seat elements can for example be a reclining backrest articulated at one end of a seat or a leg rest articulated at the other end of the seat. The configuration of each seat element can thus be changed by means of an actuating device capable of controlling, independently or simultaneously, the movement of actuators placed at the seat elements.

Furthermore, and in order to know the position of the actuators, and therefore the position of the seat elements, at any given moment, it is known to implement position sensors which allow measurement values representative of the physical positions of the actuators to be acquired. More particularly, in operation, these position sensors follow the position of the actuator output shaft which allows the position of the seat elements to be identified.

The most frequently used position sensors are potentiometers which have mechanical stops by design.

A disadvantage of such mechanical stops is that they may cause operating constraints in an attempt to avoid their destruction by the application of overtorques. Indeed, in order to protect the mechanical stops, it is necessary to add elements such as a frictional torque limiter, which generates an additional cost which is not satisfactory.

Another disadvantage of these mechanical stops is that the actuating system will be inoperative if the actuator's operating range lies outside the mechanical stops.

Before the seat is used, it is necessary to calibrate the individual actuators so that the actuating device is able to control the movement of each actuator within its permitted range of movement, between a minimum stop position and a maximum stop position. In order to perform this calibration of the actuators of the actuating device, it is known to implement a calibration method comprising steps of controlling the displacement of the actuator in one direction up to a first position and then in the other direction up to a second position with, on each occasion, a comparison of the value of the characteristic variable associated with the actuator in one and the other of the positions with a predetermined reference value so as to define two limit reference positions and thus carry out the calibration.

In addition, and in order to maintain this calibration once the calibration method has been carried out until the actuator is mounted on the seat, it is known to install an anti-rotation bar that only allows translation and thus maintain the calibration in rotation.

A disadvantage of this solution is that the calibration method is relatively long to carry out for each of the actuators, and can be relatively complex for an operator to carry out because of the precision required.

Another disadvantage is that the operator may have difficulties mounting the assembly once calibrated because of the need to keep the different actuators in balance.

Therefore a new method of calibrating an actuating device for an aircraft seat element is required.

DISCLOSURE OF THE INVENTION

The aim of the invention is to overcome at least in part the disadvantages of the prior art mentioned above.

To achieve this, the invention relates to a method for determining the position of an actuating device of at least one aircraft seat element to be actuated, the actuating device comprising a calculating unit, an actuator mounted to be movable in translation and/or rotation on an output shaft so as to activate the at least one corresponding element of the aircraft seat, said output shaft being connected to an angular position encoder so that a position X of the actuator on said output shaft corresponds to a single angular position $\theta$ of the angular position encoder, the method comprising a preliminary submethod of automatically calibrating said actuating device comprising the following steps:

a step of placing the actuator at a predetermined position Xref corresponding to an expected angle value $\theta$att of the encoder;

a step of measuring an initial positioning angle value $\theta$ini of the angular position encoder when the actuator shaft is in the predetermined position Xref;

a step of comparing said initial positioning angle value $\theta$ini and said expected angle value $\theta$att;

a step of calculating the angular offset $\theta$decal of the angular position encoder signal, with $\theta$décal=($\theta$ini−$\theta$att) [MODULO 360°], $\theta$decal being between 0° and 359°.

Thus, the invention proposes a novel and inventive approach that makes it possible to resolve at least in part some of the disadvantages of the prior art.

In particular, such a solution makes it possible to limit the constraints applied to the system and does not require the implementation of additional parts for its operation.

In addition, such a calibration method is relatively simple to perform mechanically and is not time-consuming for each of the actuators, and can be relatively easy for an operator to use, even when high precision is required.

In addition, such a solution is relatively simple in terms of mounting the assembly and it is also a reliable solution.

According to a particular aspect of at least one embodiment of the invention, the method comprises a step of measuring the position X(t) of the actuator at a given moment according to the following relationship:

$$X(t) = \frac{[(\theta + \theta\text{décal})[MODULO\,360°]]}{K} + X\text{min}$$

with Xmin a minimum position of the actuator,
with K a proportion coefficient between the angle value sent by the encoder and the value of the actuator position.

According to a particular aspect of at least one embodiment of the invention, the method comprises a step of determining a position of at least one element to be actuated of an aircraft seat as a function of said position of the actuator at a given moment X(t).

According to a particular aspect of at least one embodiment of the invention, the method comprises a step of determining a minimum angular position θmin of the encoder corresponding to a minimum position Xmin of the actuator, and a maximum angular position θmax of the encoder corresponding to a maximum position Xmax of the actuator, the maximum angular position θmax and the minimum angular position θmin having an absolute deviation of less than 360°.

According to a particular aspect of at least one embodiment of the method, if (θmin)>(θmax), the method comprises, for 355°<θ<365°:

a step of detecting the direction of rotation of said angular encoder 9;

a step of deactivating said step of measuring the position (X(t)) of the actuator at a given moment for a predetermined duration.

The predetermined period can consist of an assumed period of time during which the encoder will travel a certain number of degrees including the 359th degree and the 360th degree corresponding to degree 0. For example, this predetermined period can be about 15 ms.

The invention also relates to an actuating device of at least one element to be actuated of an aircraft seat, the actuating device comprising a calculating unit, an actuator provided with an output shaft so as to actuate at least one corresponding aircraft seat element, said output shaft being connected to an angular position encoder such that a position X of the actuator on said output shaft corresponds to a single angular position θ of the encoder, said device being configured to implement a method for determining the position of the actuating device according to one of the aforementioned embodiments.

According to a particular aspect of at least one embodiment of the invention, the actuator can be moved between a minimum position Xmin corresponding to a single minimum angular position θmin of the encoder 9 and a maximum position Xmax corresponding to single maximum angular position θmax of the encoder 9, the deviation between the maximum angular position θmax and the minimum angular position θmin being less than 360 degrees.

According to a particular aspect of at least one embodiment of the invention, the deviation between the minimum position Xmin of the actuator 3 and the maximum position Xmax of the actuator 3 is between 100 mm and 800 mm, preferably between 500 mm and 700 mm, even more preferably equal to 600 mm.

According to a particular aspect of at least one embodiment of the invention, the encoder is a magnetic encoder having an increasing or decreasing proportional periodic ramp response, the angular position θ at a given moment being measured by measuring the magnetic axis of a radially magnetised magnet fixed to the actuator.

According to a particular aspect of at least one embodiment of the invention, the calculating unit comprises a hysteresis filter.

The invention also relates to an aircraft seat, comprising at least one movable seat element, the seat being provided with at least one actuating device according to one of the aforementioned embodiments.

PRESENTATION OF THE FIGURES

The invention, and its various advantages, will be better understood in the light of the following description of an illustrative and non-limiting embodiment thereof, and the accompanying drawings, in which:

FIG. 1 is a diagram illustrating an aircraft seat according to one embodiment of the invention;

FIG. 2 is a diagram illustrating an actuating device of at least one element to be actuated of an aircraft seat according to the embodiment of FIG. 1.

DETAILED DESCRIPTION OF AN EMBODIMENT OF THE INVENTION

Figure 3:
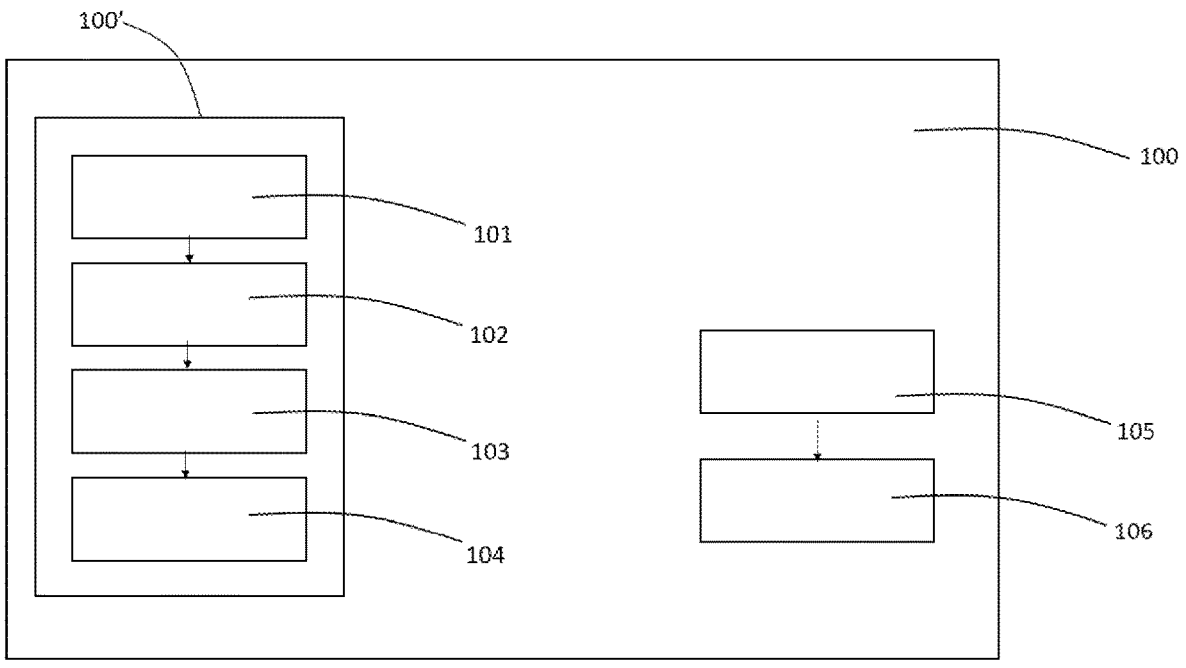
FIG. 3 is a diagram illustrating a method for determining the position of an actuating device of at least one element to be actuated of an aircraft seat according to any embodiment of the invention.

The principle of the invention is based on the implementation of a method for determining the position of an actuating device 1 of at least one element 2 to be actuated of an aircraft seat 10, this method comprising a preliminary submethod 100' for automatically calibrating the actuating device 1 so as to limit the constraints applied to the system without requiring the implementation of additional part to operate, while being relatively simple mechanically and not very time-consuming to carry out for each of the actuators.

A first embodiment of a method for determining the position of an actuating device of at least one element to be actuated of an aircraft seat, an actuating device of at least one aircraft seat element to be actuated, and an aircraft seat is now presented in relation to FIGS. 1 to 3.

FIG. 1 shows an aircraft seat comprising three elements to be actuated 2 in the form of seat elements. Here, these seat elements 2 correspond to a reclining backrest, a seat and a leg rest.

These elements 2 of the aircraft seat 10 are capable of being moved by means of an actuating device 1 including actuators 3. This movement of elements 2 of the aircraft seat 10 allows modification of the configuration of use of the aircraft seat 10.

The configuration of use of the aircraft seat 10 comprises, for example, a TTL (taxiing, take-off and landing) position, or a sleeping position, also known as a the "bed position". The configuration of use of the aircraft seat 10 can also further comprise a reference or default position.

The actuators 3 can be electric actuators for example. Alternatively, the actuators are hydraulic actuators, pneumatic actuators, or any other known type of actuator.

Each of the actuators 3 is mounted to be movable in and/or in rotation on an output shaft so as to actuate the corresponding element(s) 2 of the aircraft seat 10.

As illustrated in FIG. 2, in this embodiment, the actuators 3 are moved in translation and/or in rotation by means of one or more motors 31.

This output shaft 30 is connected to an angular position encoder 9. This encoder is, in this embodiment, a magnetic encoder with a periodically increasing or decreasing proportional ramp response. With this magnetic encoder, the angular position θ at a given moment is measured by measuring the magnetic axis of a radially magnetised magnet fixed to the actuator 3.

Here, this output shaft 30 is connected to the angular position encoder 9 such that a position X of the actuator on the output shaft 30 corresponds to a single angular position θ of the angular position encoder 9.

More particularly, the movement of the output shaft 30 is transmitted to the encoder 9, for example via a mechanical linkage 32 including a reduction as illustrated in FIG. 2, so that a translation and/or rotation of the actuator 3 on the shaft 30 results in a rotation of the encoder 9.

Here, the actuator 3 can be moved between a minimum position Xmin corresponding to a single minimum angular position θmin of the encoder 9 and a maximum position Xmax corresponding to a single maximum angular position θmax of the encoder 9.

So that a position X of the actuator on the output shaft 30 corresponds to a single angular position θ of the encoder 9, the deviation between the maximum angular position θmax and the minimum angular position θmin is less than 360 degrees, i.e. one period.

According to the embodiments, the deviation between the minimum position Xmin of the actuator 3 and the maximum position Xmax of the actuator 3 is between 100 mm and 800 mm.

Preferably, the deviation between the minimum position Xmin of the actuator 3 and the maximum position Xmax of the actuator 3 is between 500 mm and 700 mm.

In this embodiment, the deviation between the minimum position Xmin of the actuator 3 and the maximum position Xmax of the actuator 3 is equal to 600 mm.

In order to know the positioning of the actuators, a calculating unit 4 is used and is connected to each of these actuators 3.

This calculating unit 4 is firstly provided with means 40 for obtaining the angular position θ of the encoder 9. It also comprises means 41 for converting the angular position θ into the relative position X(t) of the shaft 3. It further comprises means 42 for outputting the relative position X(t) of the shaft 3.

This calculating unit 4 can also comprise a hysteresis filter.

Due to the random positioning of the encoder 9 with respect to the output shaft 30, it is necessary, prior to the use of the seat, to calibrate the various actuators so that the actuating device is capable of controlling the movement of each actuator.

Accordingly, the method for determining the position of an actuating device 1 comprises a preliminary submethod 100' of automatically calibrating the actuating device 1 comprising the following steps:

a step 101 of placing the actuator at a predetermined position Xref corresponding to an expected angle value θatt of the encoder;

a step 102 of measuring an initial positioning angle value θini of the angular position encoder 9 when the shaft of the actuator is in the predetermined position Xref;

a step 103 of comparing said initial positioning angle value θini and said expected angle value θatt, and a step 104 of calculating the angular offset θdecal of the angular position encoder signal, with θdécal=(θini−θatt) [MODULO 360°], θdecal being between 0° and 359°.

In other words, a value θatt is attributed which is to be attributed in the actuator movement control for an actuator shaft reference position 30 on the aircraft seat movement.

For this predetermined reference position Xref of the actuator shaft 30 assigned an expected angle value θatt, the encoder 9 returns an initial positioning angle θini, within the 360° measurement period, from which the modulation by the MODULO 360° function.

The initial positioning angle value θini, i.e. the measured angle, can then be compared with the expected angle value θatt, and the offset θdecal can be deduced by the relationship:

θdécal=(θini−θatt)[MODULO 360°]

This calibration step, or angular setting, step, makes it possible to determine and remember the angular offset of one encoder to another between its measured angular value and the angular value expected for the position of the shaft installed in the course of the movement to be controlled. As this offset is permanent, its identification and storage in the calibration phase allows a permanent measurement correction in the operating phase.

According to a preferred embodiment of the invention, it may be provided that the device comprises a memory for saving this angular offset value θdecal.

Following a first calibration, which may be repeated if necessary, the method of determining the position of the actuating device 1 may enter a "normal" operating mode, or operating mode and comprises a step 105 of measuring the position X(t) of the actuator 3 at a given movement according to the following relationship:

$$X(t) = \frac{[(\theta + \theta\text{décal})[MODULO\,360°]]}{K} + X\text{min}$$

with Xmin being the minimum position of the actuator, and with K being a proportion coefficient between the angle value sent by the encoder and the value of the actuator position.

It should be noted that this coefficient K can be given for example by manufacturers of the encoder or the actuator.

Then, after measuring the position X(t) of the actuator, the determination method comprises a step 106 of determining a position of at least one element 2 to be activated of the aircraft seat 10 as a function of the position of the actuator at a given moment X(t).

According to one variant of the invention, the method can also comprise a step of determining a minimum angular position θmin of the encoder 9 corresponding to a minimum position Xmin of the actuator 3, and a maximum angular position θmax of the encoder 9 corresponding to a maximum position Xmax of the actuator 3.

As already discussed, the maximum angular position θmax and the minimum angular position θmin have an absolute deviation of less than 360 degrees.

Due to the random positioning of the encoder 9 with respect to the output shaft 30, and the maximum 360° period of use of the encoder 9, an output signal transition due to the encoder passing from the end of the period of one revolution and the beginning of a second revolution may occur once, anywhere in the angular operating range of the encoder. Accordingly, in this embodiment if (θmin)>(θmax), the method comprises, for 355°<θ<365°:

a step of detecting the direction of rotation of the angular encoder 9, and a step of deactivating step 105 of measuring the position X(t) of the actuator at a given moment for a predetermined duration.

These two steps make is possible, on the one hand, to detect the direction of rotation of the angular encoder and therefore to know whether the angular encoder is approaching or moving away from a value indicating the proximity of the signal transition, and, on the other hand, to take no measurements for a predetermined period of time, this predetermined period of time making it possible to pass the angular position corresponding to the signal transition and thus not to falsify the measurements.

According to the illustrated embodiment, this step is performed if θmin>θmax and if for 355°<θ<365°. However, according to variants, the range of values can be adjusted in particular to the desired sensitivity for setting the seat elements in motion.

Furthermore, the predetermined duration can be for example between 10 and 20 ms. According to the illustrated embodiment, the predetermined period is equal to 15 ms.

The invention claimed is:

1. Actuating device of at least one element for actuating an aircraft seat, the actuating device comprising a calculating unit, an actuator mounted to be movable in translation and/or rotation on an output shaft so as the actuate the corresponding at least one element of an aircraft seat, said output shaft being connected to an angular position encoder so that a position (X) of the actuator on said output shaft corresponds to a single angular position (0) of the encoder, said device being configured to implement a method for determining the position of the actuating device, the method comprising a preliminary submethod of automatically calibrating said actuating device comprising the following steps:

a step of placing the actuator at a predetermined position (Xref) corresponding to an expected angle value (θatt) of the encoder;

a step of measuring an initial positioning angle value (θini) of the angular position encoder when the actuator shaft is in the predetermined position (Xref);

a step of comparing said initial positioning angle value (θini) and said expected angle value (θatt);

a step of calculating the angular offset (θdécal) of the angular position encoder signal, with θdécal=(θini−θatt) [MODULO 360°], θdécal being between 0° and 359°; and a step of measuring the position (X (t)) of the actuator at a given moment according to the following relationship:

$$X(t) = \frac{[(\theta + \theta\text{décal})[MODULO\,360°]]}{K} + X\text{min}$$

with Xmin a minimum position of the actuator, and with K a proportion coefficient between the angle value sent by the encoder and the value of the actuator position.

2. The actuating device according to claim 1, wherein the actuator can be moved between the minimum position (Xmin) corresponding to a single minimum angular position (θmin) of the encoder and a maximum position (Xmax) corresponding to a single maximum angular position (θmax) of the encoder, the deviation between the maximum angular position (θmax) and the minimum angular position (θmin) being less than 360 degrees.

3. The actuating device according to claim 2, wherein the deviation between the minimum position (Xmin) of the actuator and the maximum position (Xmax) of the actuator is between 100 mm and 800 mm.

4. The actuating device according to claim 2, wherein the deviation between the minimum position (Xmin) of the actuator and the maximum position (Xmax) of the actuator is between 500 mm and 700 mm.

5. The actuating device according to claim 2, wherein the deviation between the minimum position (Xmin) of the actuator and the maximum position (Xmax) of the actuator is equal to 600 mm.

6. The actuating device according to claim 1, the method further comprising a step of determining a position of at least one element to be actuated of an aircraft seat as a function of said position of the actuator at a given moment X (t).

7. The actuating device according to claim 1, further comprising a step of determining a minimum angular position (θmin) of the encoder corresponding to a minimum position (Xmin) of said actuator, and a maximum angular position (θmax) of the encoder corresponding to a maximum position (Xmax) of said actuator, the maximum angular position (θmax) and the minimum angular position (θmin) having an absolute variance of less than 360 degrees.

8. The actuating device according to claim 7, wherein if (θmin)>(θmax), the method comprises, for 355°<θ<365°:

a step of detecting the direction of rotation of said angular encoder;

a step of deactivating said step of measuring the position (X (t)) of the actuator at the given moment for a predetermined period.

9. The actuating device according to claim 1, wherein the encoder is a magnetic encoder having a periodical proportional increasing or decreasing ramp response, the angular position (θ) at a given moment being measured by measuring the magnetic axis of a radially magnetised magnet attached to the actuator.

10. The actuating device according to claim 1, wherein said calculating unit comprises a hysteresis filter.

11. An aircraft seat, comprising at least one element of a movable seat mobile, wherein the seat is provided with at least one actuating device according to claim 1.

* * * * *